(12) United States Patent
Alfier et al.

(10) Patent No.: US 11,178,745 B2
(45) Date of Patent: Nov. 16, 2021

(54) LIGHTING APPARATUS AND CORRESPONDING SYSTEM, METHOD AND COMPUTER PROGRAM PRODUCT

(71) Applicant: OSRAM GmbH, Munich (DE)

(72) Inventors: Alberto Alfier, Vedelago (IT); Renato Frison, Chions (IT)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 17/072,049

(22) Filed: Oct. 16, 2020

(65) Prior Publication Data

US 2021/0127472 A1    Apr. 29, 2021

(30) Foreign Application Priority Data

Sep. 22, 2020   (EP) .................... 20197400

(51) Int. Cl.
  *H05B 47/115*    (2020.01)
  *H05B 45/10*    (2020.01)
  (Continued)

(52) U.S. Cl.
  CPC ........ *H05B 47/115* (2020.01); *H01S 3/10038* (2013.01); *H05B 41/38* (2013.01); *H05B 45/10* (2020.01)

(58) Field of Classification Search
  None
  See application file for complete search history.

(56) References Cited

U.S. PATENT DOCUMENTS 6,002,505 A     12/1999 Kraenert et al.
2014/0036235 A1   2/2014 Chang et al.
(Continued)

FOREIGN PATENT DOCUMENTS

CN    109194869 A    1/2019
DE    19640404 A1    4/1998
(Continued)

OTHER PUBLICATIONS

European Search Report issued for the corresponding EP application No. 20197400.3 dated Apr. 21, 2021, 9 pages for (informational purpose only).

(Continued)

*Primary Examiner* — Jany Richardson
(74) *Attorney, Agent, or Firm* — Viering, Jentschura & Partner mbB

(57) ABSTRACT

A lighting apparatus, for example for applications in the show-business or entertainment sector, including: a light-radiation generator, for example a laser generator, configured for projecting a lighting beam towards a lighting space in a certain direction; control circuitry of the light-radiation generator configured for controlling emission of the lighting beam by the light-radiation generator; and processing circuitry configured for calculating a thermal retinal radiance ratio of the light-radiation generator as a function of a distance from the light-radiation generator in the aforesaid direction and for acting on the control circuitry of the light-radiation generator in order to control the lighting beam of the light-radiation generator as a function of the thermal retinal radiance ratio, with the aim of maintaining the aforesaid thermal retinal radiance ratio below unity starting from a certain value of distance from the light-radiation generator in the aforesaid direction.

9 Claims, 3 Drawing Sheets

(51) Int. Cl.
*H01S 3/10* (2006.01)
*H05B 41/38* (2006.01)

(56) References Cited

U.S. PATENT DOCUMENTS

| | | | | |
|---|---|---|---|---|
| 2016/0018258 A1* | 1/2016 | Goldsmith | ............ | G03B 43/00 356/121 |
| 2017/0373454 A1* | 12/2017 | Hay | ............ | G02B 26/127 |
| 2020/0112713 A1 | 4/2020 | Li | | |
| 2020/0116338 A1 | 4/2020 | Angenendt et al. | | |

FOREIGN PATENT DOCUMENTS

| EP | 3637367 A1 | 4/2020 |
|---|---|---|
| WO | 9955122 A1 | 10/1999 |
| WO | 2012120386 A1 | 9/2012 |
| WO | 2015143423 A1 | 9/2015 |
| WO | 2019002546 A1 | 1/2019 |

OTHER PUBLICATIONS

Schulmeister et al.: "Risk of retinal injury from "Risk Group 2" laser illuminated projectors", Journal of Laser Applications 28, 042002; Jun. 28, 2016; 12 pages; Laser Institute of America.

Rue De Varembé, Photobiological safety of lamps and lamp systems—Part 5: Image projectors, IEC 62471-5, ISBN 978-2-8322-2737-4, dated Jun. 9, 2015, 54 pages, International Electrotechnical Commission.

International Commission on Non-Ionizing Radiation Protection, ICNIRP Guidelines, on Limits of Exposure to Incoherentvisible and Infrared Radiation,Health Physics 105(1):74-96; 2013.

Karl Schulmeister, Analysis of the Blue Light Hazard Relative to the Retinal Thermal Hazard for Image Projectors, Edition 2, Jun. 2016, 15 pages, Seibersdorf Labor GMBH.

Akoto Chama Leonel, Determination of Retinal Thermal Hazard and Blue Light Photochemical Hazard Protection Needed by Automatic Welding Filters, Degree Project Magister Thesis Mechanical Engineering No. E3726M, Sep. 20, 2009, 130 pages, 3M Svenska AB/ Research and Development Department.

Search Report issued in the corresponding Italian Patent Application No. IT201900019634, dated Jul. 6, 2020, 10 pages (for reference purposes only).

* cited by examiner

LIGHTING APPARATUS AND CORRESPONDING SYSTEM, METHOD AND COMPUTER PROGRAM PRODUCT

CROSS-REFERENCE TO RELATED APPLICATIONS

This application claims priority, under 35 U.S.C. § 119, to European Patent Application No. 20197400.3 filed on Sep. 22, 2020 and to Italian Application No. 102019000019634 filed on Oct. 23, 2019, the contents of which are both incorporated by reference in their entirety.

TECHNICAL FIELD

The present disclosure relates to lighting apparatuses. One or more aspects may find use, for example, in the show-business and entertainment sector.

BACKGROUND

In various sectors such as the show-business and entertainment sectors, lighting apparatuses are used. These lighting apparatuses may include projectors with mobile head(s) capable of generating lighting beams with different beam angles including high-intensity discharge lamps (HIDs) or, to a greater extent, light-emitting diode (LED) generators, for example, with white emission obtained via phosphor conversion.

In various conditions of use (e.g., mobile applications, major events, and/or film sets or television studios), it is desirable to have available, in addition to colored lighting beams, high emission powers. Such considerations may suggest resorting to laser sources which are able to supply values of luminance higher than those of traditional sources and LED sources while maintaining, along with contained dimensions and weights, the capacity of regulating (scaling) the output lighting power.

The use of systems with high lighting power, with corresponding increases in the output flux power, entails the need to pay attention to safety issues (in particular, regarding the safety of the audience). For example, this may include issues in relation to the photobiological hazard linked to undesired observation of these sources.

In this regard, it is possible to define—with data verified experimentally—classes of hazard of the source or fixtures. For example, sources classified as RG1 (with low hazard) can be observed without any particular risks.

It is desirable to be able to extend the above safety conditions to sources and possible configurations of sources of different types.

Proceeding along these lines, it is found that undesired observation of a source of light radiation may be considered risky in the case where the intensity of the lighting beam of a source that could strike the eyes of an observer is above a certain value of power density or luminance.

It is likewise found that this level of optical intensity varies as a function of factors such as the distance, the conditions of focusing of the beam, the dimming values, and so forth.

SUMMARY

According to one or more aspects, solutions are provided to solve the problems outlined above, primarily regarding the possibility of reliably countering photobiological hazards taking into account a class of hazards associated with a certain light source or fixture.

According to one or more aspects, these solutions may be achieved thanks to a lighting apparatus having the characteristics described in the present disclosure.

One or more aspects may provide a corresponding lighting system, for example, for application in the show-business and entertainment sector.

One or more aspects may provide a corresponding method, as well as a corresponding computer program product, which can be loaded into the memory (either temporary or not) of at least one computer device and include portions of software code for executing the steps of the method when the product is run on at least one computer.

As used herein, reference to such a computer program product is understood as being equivalent to reference to a computer-readable means containing instructions for controlling the processing system in order to co-ordinate implementation of the method according to the disclosure.

Reference to "at least one computer device" highlights the possibility of one or more aspects being implemented in a modular and/or distributed form.

The claims may form an integral part of the technical teachings provided herein in relation to the aspects.

One or more aspects may draw benefit from the fact that, for a certain combination of parameters such as to identify the state of a lighting source (such as a projector), it is possible to define a safety distance, e.g., a distance beyond which the source can be considered such as not to give rise to appreciable risks for the person observing the source itself, perhaps in an altogether accidental way, as may happen to a member of the audience who is watching a certain show.

One or more aspects can facilitate an act of modification of the parameters of a certain light source (e.g., a projector), which aims at maintaining the source in safe operating conditions, simplifying the activity of the lighting manager or designer and enabling the latter to limit their own intervention to a restricted set of commands/values while the desired safety conditions can be attained in an automatic way.

BRIEF DESCRIPTION OF THE DRAWINGS

One or more aspects will now be described, purely by way of non-limiting example, with reference to the annexed drawings, in which.

Identical, similar or similar-looking elements are provided with the same reference signs in the figures. The figures and the proportions of the elements depicted in the figures relative to each other are not to be considered as true to scale. Rather, individual elements may be displayed in an exaggeratedly large format for better presentation and/or comprehensibility.

DETAILED DESCRIPTION

In the ensuing description, various specific details are illustrated in order to enable an in-depth understanding of various examples of aspects according to the description. The aspects may be obtained without one or more of the specific details, or with other methods, components, materials, etc. In other cases, known structures, materials or operations are not illustrated or described in detail so that the various aspects of the aspects not will not be obscured.

Reference to "an aspect" or "one aspect" in the framework of the present description is intended to indicate that a particular configuration, structure, or characteristic described in relation to the aspect is included in at least one aspect. Hence, phrases such as "in an aspect" or "in one aspect" that may be present in various points of the present description do not necessarily refer exactly to one and the same aspect. Moreover, particular conformations, structures, or characteristics may be combined in any adequate way in one or more aspects.

The references used herein are provided merely for convenience and hence do not define the sphere of protection or the scope of the aspects.

Figure 1:
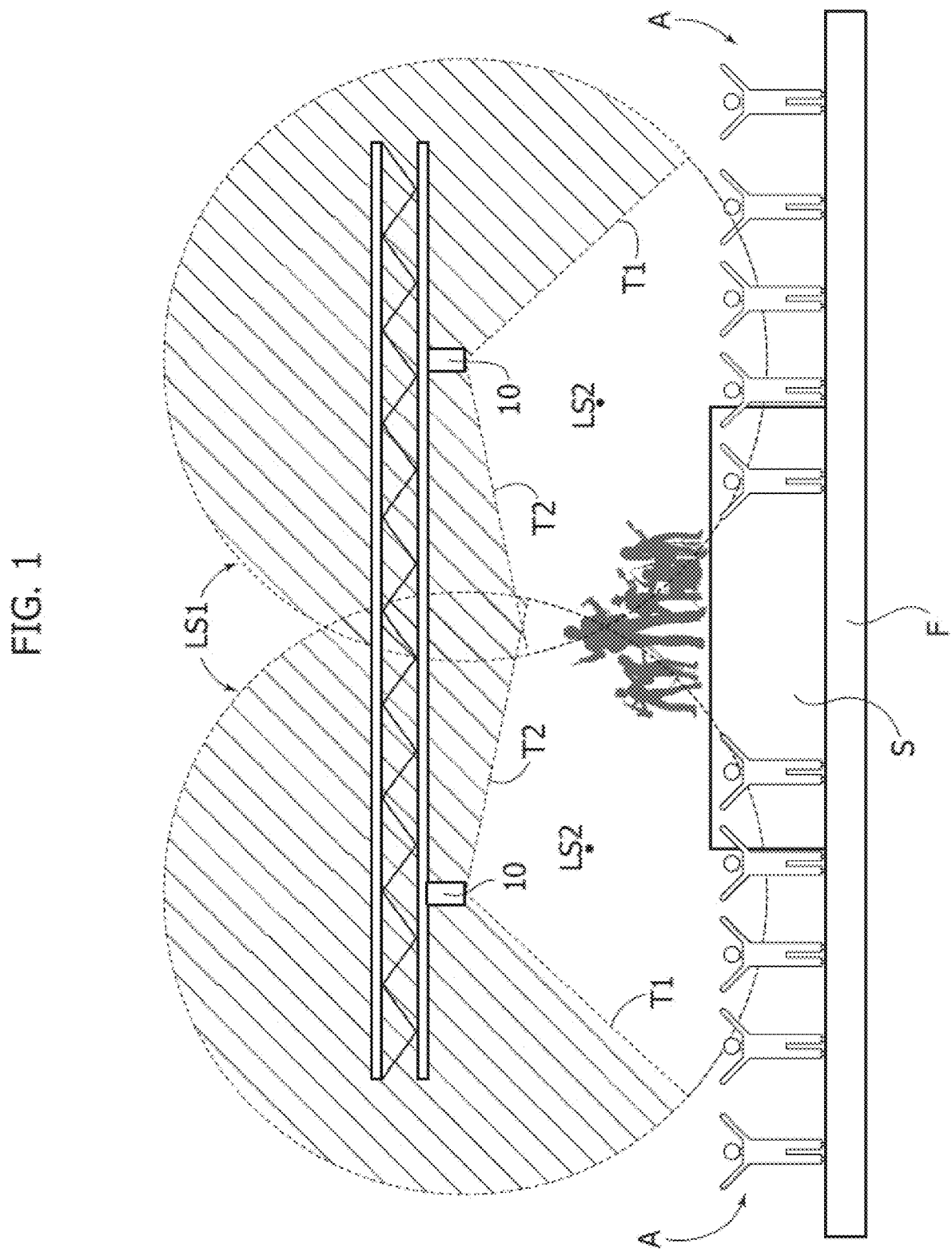
FIG. 1 shows a view in elevation that exemplifies possible contexts of use of aspects.

FIG. 1 shows (in an example view in side elevation) a situation in which a scene or stage S, mounted on a ground or floor F where the audience A is present, is lit via a lighting system assumed as including for simplicity (and in a non-limiting way) two lighting apparatuses 10.

It will on the other hand be noted that reference, made in a practically constant way throughout this description, to applications in the show-business and entertainment sector is to be understood as being provided merely by way of example and hence in no way limits the possible sectors of application of the aspects.

One or more aspects aim at enabling control of operation of the apparatuses 10 as a function of a respective value of safety distance (represented for simplicity as being the same for the two apparatuses, but it may be identified in different ways for different apparatuses, according to the criteria discussed in what follows), beyond which the apparatuses 10 can be observed even directly (i.e., with the eyes of the observer directly facing the surface of emission of light radiation) without giving rise to a so-called photobiological hazard.

Once again, and purely by way of example (and mainly in order to provide a clearer picture right from the start of some possible operating modes that may be adopted for pursuing the above purpose), it is possible to define, for the apparatuses 10:

an "operative" range, i.e., a desired lighting range, designated by LS1, which may, for example, be included between tilt values (i.e., values of scanning in a vertical plane) T1 and T2 with the apparatuses pointing upwards (away from the audience A), and an "inoperative" range, i.e., an undesired lighting range, designated by LS2, which—once again as regards the tilt—is included between the values T1 and T2 with the apparatuses pointing downwards (i.e., towards the audience A).

In some non-limiting examples, substantially similar considerations may be made as regards panning, i.e., the movement of scanning or slewing in the horizontal direction.

In this way, i.e., by containing the projection of the lighting beam of the apparatuses 10 towards the undesired zone or zones (LS2, for example), the apparatuses 10 can be observed, without giving rise to a photobiological hazard, also by people in the audience A who, being at a short distance from the apparatuses in the zone LS2, look straight into the surface of emission of the light radiation: in this zone projection of the lighting beam of the apparatuses is, in fact, constrained.

The above may be obtained, for example, by dimming the intensity of the lighting beam emitted by the apparatus 10, deactivating the source of the beam, preventing pointing of the beam towards the zone LS2, or in various other manners provided by way of example in what follows.

In this regard, it will be appreciated that, rather than regarding the nature of the interventions that may be implemented for containing projection of the lighting beams of the apparatuses 10 towards the undesired zone or zones, one or more aspects chiefly regard the criteria for identifying, also in a dynamic way, the aforesaid respective value of safety distance, it being possible to take into account different aspects that may enter into play in the determination of safety conditions for lighting systems of the type provided by way of example in FIG. 1.

In this connection, one or more aspects may be employed in the case of lighting apparatuses 10 that use laser light-radiation generators. One or more aspects may, however, be used also in combination with sources of light radiation of different types, for instance sources that use for example light-emitting diode (LED) generators or high-intensity discharge (HID) lamps.

One or more aspects may facilitate lighting managers or designers in the use of lighting apparatuses and systems in conditions of safety, for example for the audience A that is watching a show. In this regard, it is once more recalled that the range of possible applications of one or more aspects is not limited to the show-business and entertainment sector.

Figure 2:
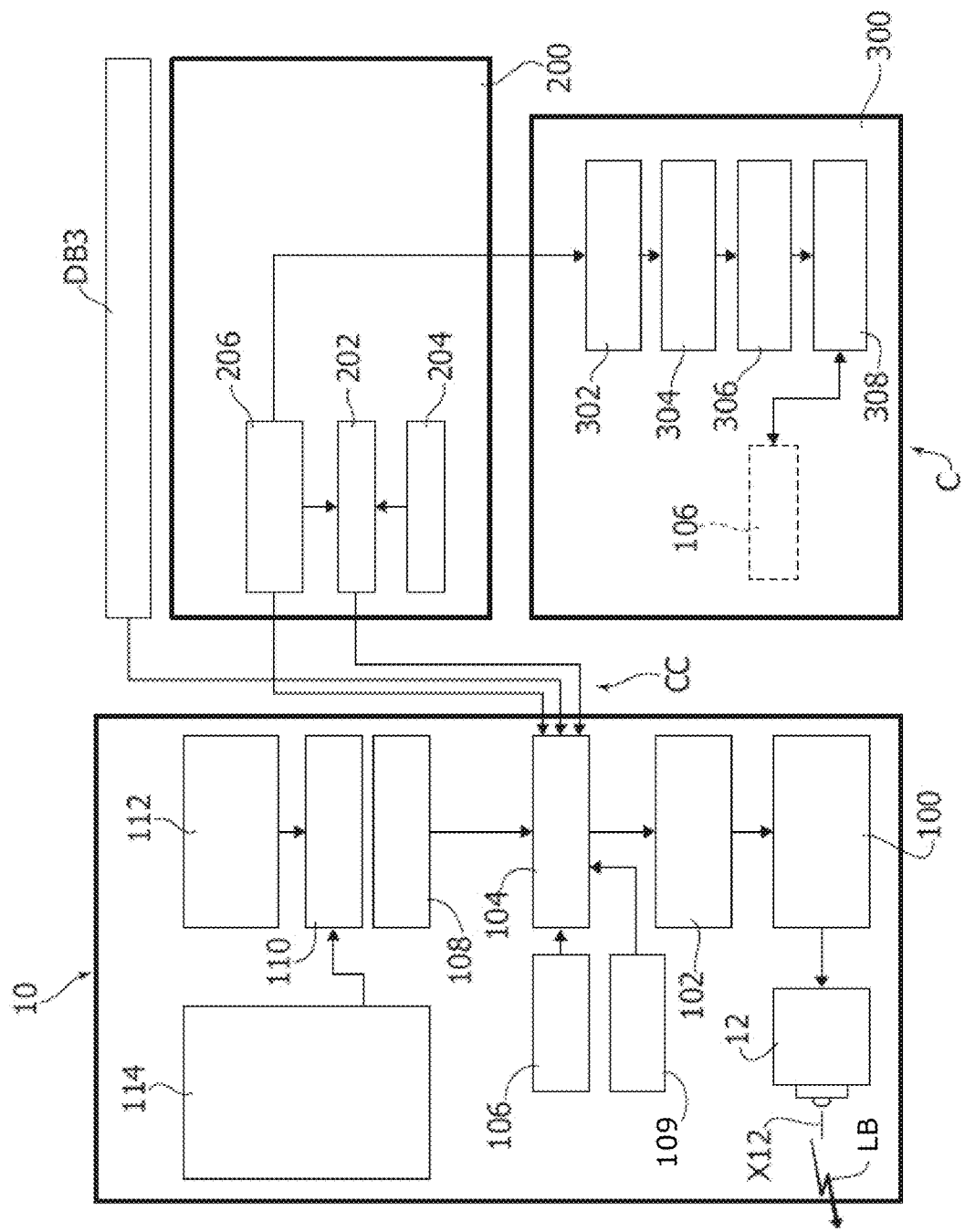
FIG. 2 shows a block diagram of an apparatus according to some aspects.

FIG. 2 shows a block diagram that exemplifies a possible structure of a lighting apparatus 10 of the type exemplified in FIG. 1.

For simplicity and clarity of explanation, the ensuing description will refer to just one apparatus 10, it remaining on the other hand understood that a system as represented in FIG. 1 may include any number of apparatuses or fixtures 10 (in what follows they will be referred to for brevity also as "sources").

In FIG. 2, the apparatus 10 is represented together with one or more processing, computing, and/or storage components designed to co-operate with the apparatus 10 itself.

For simplicity of representation, the above components are represented in the right-hand part of FIG. 2 as "external" with respect to the apparatus or fixture 10, even though they can be at least partially integrated in the apparatus 10, e.g., be provided on board the apparatus 10 itself.

In one or more aspect, these components may be located in different ways.

Apart from being at least partially set on board the apparatus 10, these components may be included in a control device (for example, a so-called console C), which may be used by an operator, such as a lighting designer or manager, for controlling operation of a system including the apparatus 10.

In one or more aspects, these components may be located in one or more remote processing, computing, and/or storage units, this possibility even including an at least partial allocation at a cloud level.

The components illustrated in the right-hand part of FIG. 2 may be able to communicate with the apparatus 10 via one or more communication channels (designated as a whole by CC), which, owing precisely to the different possible modes of allocation of such resources, may assume different characteristics: wired connections, wireless connections, network connections, etc.

In one or more aspects such as the ones provided by way of example in FIG. 2, the apparatus 10 includes a light-radiation generator 12 of any known type (lasers, LEDs, and traditional sources such as HID lamps), which may present various features, for example as regards the characteristics of the radiation emitted (white and/or colored, for example).

When activated, the generator 12 (which may include one or more sources of light radiation) emits along a main axis X12 a beam of light radiation LB the intensity and orientation of which (e.g., in the movement of scanning of the lighting space LS1, LS2 of FIG. 1) may be controlled—in some non-limiting examples—by a control assembly 100.

The assembly 100 is able to operate (both as regards the characteristics of the beam LB—for example as regards the intensity of the light radiation—and as regards the orientation thereof in space) as a function of control data supplied by a (hardware and/or software) circuit module 102 which is able to receive data at input from an input unit 104.

As discussed in what follows, these input data may derive from processing, possibly entrusted at least in part to components such as the components represented on the right in FIG. 2, of input data that may arrive from different sources.

In one or more aspects, the above sources may, for example, include:

a safety table 106, which may be implemented, for example, via a memory;

a first database 109, which may be implemented in the same way and may contain, for example, three-dimensional spatial data; and pre-analysis data coming from a corresponding unit 108.

In one or more aspects, the unit 108 may be able to operate on data stored in a memory 110 starting from two sets of sensors designated, respectively, by 112 and 114.

The sets of sensors 112 and 114 may include sensors configured for performing the corresponding operations of detection either once and for all (e.g., upon installation of the system) or in a periodic way, or else again by supplying data corresponding to measurements to be deemed constant for a given apparatus 10 or system.

In one or more aspects, the first set of sensors 112 may include sensors that are able to detect parameters that can be considered such as to identify the state of operation "internal" to the apparatus 10 at a certain instant in time and for a certain location/orientation in space.

Examples of parameters of this nature may be the following:

the supply current or currents of the generator 12 (possibly, the value of pulse width at half the maximum value—parameter commonly referred to as "pulse-width half maximum"—in the case of driving with constant current);

the output power of the light radiation, which may be detected, for example, via a photodiode located in a given position along the path of propagation of the beam of light radiation LB, without altering the performance of the generator and without introducing artefacts;

one or more chromatic characteristics of the radiation, which can be detected, for example, via one or more photodiodes possibly provided with optical filters;

values of pan (movement of scanning or slewing to the right or to the left of the beam LB in a horizontal plane) and/or tilt (movement of pointing upwards or downwards of the beam LB in a vertical plane) also, possibly, as a function of the lens of the projector;

lens configurations, for example zoom, wide/narrow beam, and possible angles included between these extreme values;

effects on the so-called gobo plane, gobo wheel used, position of rotation thereof, possible use of prisms, chromatic filters, etc.;

temperature of the sources of light radiation and/or of specific areas of the projector that are potentially critical as regards, for example, diaphragm opening, etc.; and speed and possible noise of cooling fans.

It will be recalled that by "gobos" are meant templates, usually disk-shaped and made of metal or glass, which have the purpose of projecting images, texts, logos, or patterns operating substantially as slides capable of withstanding the heat developed by high-power light sources.

In some non-limiting examples, the different nature of the parameters provided by way of example can result in corresponding differences in the sensors used. These may for example be movement sensors such as encoders associated, for instance, to a lens groups or filters, current and/or voltage sensors for detecting driving signals, optical sensors for detecting the intensity and/or chromatic characteristics of the light emission, sensors of various nature for detecting the positions of a stepper motor, etc.

In one or more aspects, the second set of sensors 114 may include sensors that are able to detect parameters that can be considered "external" to the apparatus 10 such as, for example:

radiance measured in a fixed position in the direction of propagation or projection of the beam LB;

level of lighting (already) present in the environment illuminated by the apparatus 10;

position of the smallest focus spot for different beam configurations;

diameter of the beam in the projection plane;

presence of obstacles, people, etc.;

projection distances; and apparent size of the light source, for example as perceived by an observer who is looking directly into the source of the beam LB.

Also in this case, according to some non-limiting examples, the different nature of these parameters can result in corresponding differences in the sensors used.

The components represented on the right in FIG. 2 may, for example, include, a processing unit 200 capable of generating and sending to the apparatus 10 (for instance, to the function exemplified by block 104) data processed by a (hardware and/or software) unit 202, which is able to co-operate with a (second) database 204 containing data of morphology of the environment, for example three-dimensional data, and to process signals generated by fixed or mobile external sensors 206 operating according to the criteria discussed in what follows.

The signals of these sensors may likewise be sent to a further component (e.g., a processor/computer) 300 configured for processing the data received on an input interface 302 and possibly stored in a memory 304 that co-operates with a further (hardware and/or software) unit 306 so as to carry out a (further) function of data analysis, represented schematically by block 308. This analysis may also be made as a function of data retrieved from the safety table 106, again represented with a dashed line in the right-hand part of FIG. 2 for ease of understanding.

One or more aspects may organize operation of aspects as exemplified here according to a sequence that may be either procedural or temporal.

The above mode of operation is suited to being programmed and implemented by resorting to processing circuitry, which, as exemplified in FIG. 2, may be of a distributed nature, with functions performed either at the level of the apparatus 10 or on the outside, as, in fact, exemplified in FIG. 2.

This applies also with regards to the possibility of providing at least some of the above functions, for example, a third database DB3 containing spatial data, for instance the three-dimensional morphology, at a cloud level (which can be defined as 3D point cloud).

Also on the basis of the above considerations (and as has already been said), the communication channel CC may in effect be represented by one or more physical vectors which resort to different technologies/protocols (e.g., WiFi, Cloud, Bluetooth, DMX, RDM, and so forth).

Figure 3:
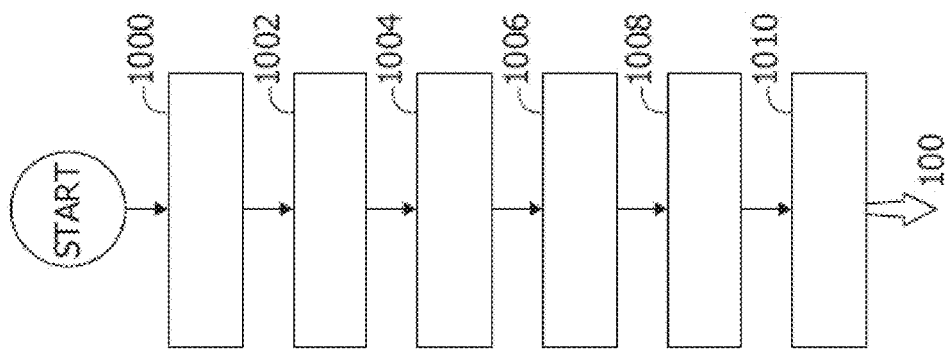
FIG. 3 shows a flowchart that exemplifies various possible acts in some aspects.

In one or more aspects, the corresponding procedure may be organized according to the criteria exemplified in the flowchart of FIG. 3.

After start of the procedure (START), in an act exemplified by block 1000, it is possible to collect from the sensors 112 and/or 114 a first set of parameters that are able to identify the "internal" status of the apparatus 10.

These may, for example, be parameters that identify the values of intensity of emission of the generator 12 (flux), the angles of the beam and the directions of orientation of the axis X12 thereof, the intensity and spectrum of the beam itself, effects inserted in the gobo plane. These may be parameters that can be considered such as to define the thresholds of photobiological hazard.

There may moreover be included the parameters linked to other internal aspects of the fixtures, such as: the temperature of the light engine or else the speed and noise level of the fans; the position of the lens groups (which are able to identify the value of angle of aperture of the beam LB), the operating conditions of the corresponding motors, the presence of a specific gobo image, the presence of specific chromatic filters, the current intensity or the value of duty-cycle of the pulse-width modulation (PWM) applied to the generator 12 or else to a subset of sources of radiation included therein (this may be the case of generators 12 with a number of colors, where it may be envisaged that one or more colors are activated while the others are deactivated).

The act of collection of the above data may also include the collection of positioning parameters of the generator 12 (e.g., the ones that identify the position of the apparatus 10 in space). These parameters may be provided, for example, via LIDAR systems, vision systems (possibly stereoscopic vision systems), radiofrequency scanning, and various transducers.

As regards to the possible use of LIDAR systems, mentioned also hereinafter, for example, as regards to the location of objects/people, reference may for example be made to WO 2019/002546 A1, which corresponds to US 2020/0116338 A1, which is incorporated by reference.

Such a LIDAR system is suited to being mounted (in a fixed or mobile position) on the outside of an apparatus such as the apparatus 10, on the base of the above apparatus (thus possibly being in a fixed position) or else integrated in the apparatus (thus possibly being mobile therewith).

The operation of collection of the above data may also include collection of parameters detected via sensors that are able to gather remotely data regarding possible changes implemented by an operator, for example an operator who manually changes the position of installation of the apparatus 10, and again the collection of environmental parameters, such as ambient noise.

The act of collection of the above data may include parameters that are able to affect the characteristics of the beam:

directly (this may for example be the case of adjustment of the source of light radiation or else of adjustment of the beam angle or else again the position of the apparatus 10); and/or indirectly (this may for example be the case of the speed of a cooling fan; this can be reduced in certain applications to facilitate reduction of the ambient noise, entailing on the other hand—in order to reduce generation of heat—a dimming of the power of light emission with the result of causing also variation of beam intensity).

In an act exemplified by block 1002 in the flowchart of FIG. 3, a second set of parameters regarding "external" operating characteristics of the apparatus 100 can be collected by the sensors 112 and/or 114.

These are signals that provide information on the external status of the apparatus 10, in particular of the generator 12, and can be gathered, for example, via sensors that detect in real time, for instance, the radiance measured in a certain position in space of the scene and in the direction of propagation of the lighting beam, the average lighting present in the scene environment, the diameter of the lighting beam obtained in the projection plane, the presence of obstacles and/or people, the projection distance, the apparent size of the source, and so forth.

These parameters may also include feedback signals regarding controls or failures detected in the communications between the sensors and the processing functions (which, as has been seen, may be of a distributed nature) or more in general in any procedure in which a sensor verifies (e.g., in real time) adjustment values—factory and operating values—of the apparatus 10 by comparing them with default values or else with expected values.

It will on the other hand be appreciated that, at the level of the present description, which is provided merely by way of example, the distinction between "internal" parameters (act designated by 1000) and "external" parameters (act exemplified by block 1002) is irrespective of whether the sensors 112 and 114 are located internally or else externally.

In other words—as emerges from the foregoing description provided by way of example—some parameters external to the apparatus 10 may be detected also via sensors set inside it and, in a symmetrical way, some internal parameters can be detected also thanks to sensors located outside the apparatus 10.

In general terms, it is reasonable to assume that the parameters can be considered "internal" if they indicate an intrinsic characteristic/property of the generator 12 (e.g., current of the source, color set, zoom configuration, effects introduced at the level of gobo images, temperature of the light engine, etc.), and may, instead, possibly be considered "external" when they indicate properties that can be measured outside the generator 12 (radiance or lighting produced at a certain distance from the projector, position of focus point outside the projector, diameter of the light distribution in the projection plane, etc.).

A third act, exemplified by block 1004 of the flowchart of FIG. 3, envisages generation, for example at the level of processing unit 200, of a map of the environment (which may basically be a three-dimensional map or, possibly—in aspects of a simplified type—a two-dimensional or one-dimensional map) of the environment surrounding the apparatus 10.

In this regard, it will be appreciated that this operation of mapping of the environment (which may be a morphological mapping such as to take into account both the geometry and the possible occupation of the environment, i.e., for example, where the audience A is expected to be) may occur also in a way independent of the effective installation of the apparatus 10. This operation of mapping of the environment may in fact be carried out possibly also before the lighting apparatus 10 is effectively mounted in the final location envisaged: for example, the stage of a theatre or else of a stadium or arena (e.g., in the case of music events).

The above mapping operation may be carried out, for example, using scanning devices, for instance, via LIDAR systems, vision systems (possibly stereoscopic vision systems), radiofrequency scanning systems, and various transducers. In addition or as an alternative, this mapping operation can be performed also starting from data on the geometry of the environment available from other sources, for example from design drawings.

The corresponding information may be stored in any one of the databases exemplified by blocks 109, 204 and DB3 in FIG. 2. In this regard, it will be appreciated that the fact of having represented a number of options of this nature does not have a limiting character: one or more aspects may envisage the presence even of just one of such databases.

In an act exemplified by block 1006 in the flowchart of FIG. 3, the information collected in the previous acts exemplified by blocks 1000, 1002 and 1004 can be combined, for instance at the level of the processing functions 300, so as to generate—for instance by operating according to optics criteria in some non-limiting examples—an (estimated) map of the radiance of the lighting beam projected, which includes the apparent size of the latter as this can be perceived by an observer. This is accompanied by the possibility of evaluating in any position in space that can be reached by the lighting beam LB of the generator 12 the radiance values and the apparent size corresponding to a certain status of the apparatus 10.

As used herein—according to a terminological choice widely recognized in the sector—radiance is a parameter indicating the power emitted, reflected, transmitted, or received by a surface that can be collected by an optical system that observes the aforesaid surface starting from a specified viewing angle (the solid angle subtended by the input pupil of the observing optical system).

The above terminological choice takes into account the fact that radiance, and the quantity connected thereto known as "luminance", are at times encompassed in the term, in itself not completely satisfactory but widely used in some sectors, such as laser physics, of "brightness".

In applications where it is desired to take into account the photobiological hazard of the eye of an observer, the human eye is a good example of such an optical system so that radiance and luminance constitute good indicators of the apparent brightness of an obj ect.

The radiance divided by the refractive index is an invariant quantity in geometrical optics, so that in an optical system (in air) the radiance at output is equal to the radiance at input (the so-called conservation of radiance). With the exception of a Lambertian surface, the radiance of a surface is in general a function of the direction of observation.

With regards to operation of sensors, such as the sensors considered in the present description, the radiance emitted by a source of light radiation (such as a generator 12 as exemplified in FIG. 2) may be defined with respect to the area of the surface of the source and to the solid angle in which the light is emitted along the axis X12. In the case of the radiance received by a detector, the radiance may be defined with respect to the area of the surface of the detector or sensor and to the solid angle subtended by the source as observed by the detector/sensor. The principle of conservation of radiance invoked previously makes it possible to assume reasonably that the radiance emitted by a source corresponds to the radiance received by a detector/sensor that observes it.

The corresponding information, which can also be generated by resorting to measurements and/or simulations, can be stored at the memory level in any one of the databases/memories exemplified in FIG. 2. As has already been described, the fact of having represented a number of options of this nature is not to be understood in a sense that in any way limits the aspects.

This information, from which it is possible to draw even before using the apparatus 10, facilitates a "smart" behavior by the apparatus 10, which can use this information for regulating its operating parameters so as to be able to operate in a way that is safe, for example, for the audience.

In an act exemplified by block 1008 of the flowchart of FIG. 3, a processing function, which can be integrated in the apparatus 10 (see, for example, blocks 102 and 104 in FIG. 2) is activated to derive from this information a virtual "zonal" map of the environment, which may include, for instance, certain undesired lighting zones (e.g., the zones designated by LS2 in FIG. 1), where the act of lighting should be constrained, possibly preventing projection of the beam LB towards these zones or else enabling lighting of these zones with certain limitations (reduced intensity, modified apparent size, etc.), for example as a function of a hazard level so as to condition the choice of given configurations of operation that can be applied to these zones.

In this way—as discussed in what follows—operation of the generator 12 can be controlled (e.g., at the level of block 100) so as to facilitate—via a corresponding fixing of operating parameters for a hazard zone or zones—safe operation both for the audience and for the staff.

As on the other hand has already been said, more than the nature of the interventions that can be implemented for containing the projection of the lighting beam LB of the apparatus 10 towards the undesired zone or zones, one or more aspects chiefly regard the criteria for identifying, also in a dynamic way, corresponding values of safety distance to be respected.

This result can be achieved in different ways, for example on the basis of the safety map exemplified by block 106.

One or more aspects can base their operation on the criterion whereby, given a certain profile of intensity and an angle of projection of the lighting beam LB of a generator such as the generator 12 of FIG. 2, there may exist a distance in the direction of propagation/projection of the beam LB of the generator 12 (e.g., along the optical axis X12) beyond which the radiance drops below a risk-level threshold (e.g., below the levels of hazard identified as 3 or 2 according to the current standard) so as to facilitate "safe" operation of the apparatus 10.

As has been seen, FIG. 1 exemplifies the possibility of performing the above act of constraining the action of lighting by intervening on the angles of orientation of the beam LB (e.g., tilt) by dividing the lighting space into:

zones such as the zone designated by LS1 in FIG. 1, where operation of the source 10 may be allowed without any particular limitations, for example at full power, and zones such as the zone designated by LS2 in FIG. 1, where operation of the apparatus 10 may be controlled in such a way as to constrain the action of lighting, for example preventing pointing of the beam in this zone, or else dimming the light intensity, possibly as far as complete deactivation of the generator, in the case where the axis X12 is oriented so as to project the beam towards a zone such as the zone LS2.

One or more aspects make it possible to vary—for example, extend or else reduce—the amplitude of the pan and tilt movements, for example by getting the values of the limit angles to vary as exemplified by T1 and T2 in FIG. 1, possibly in different ways for different sources 10.

In one or more aspects, such an act of control of operation of the apparatus 10 may be carried out, facilitating obtaining of safe operating conditions, according to a wide range of modes of intervention that may be rendered selectable by the user.

Just to cite some examples, the aforesaid act of control, exemplified by block 1010 in the flowchart of FIG. 3 (which is represented such as to enable intervention on the control circuits of the generator 12 designated by 100 in FIG. 2) may be conducted taking into account the presence or setting of parameters or control features of the generator 12, such as:

zoom configuration;

value of generated/emitted power;

spectral combination (color) of the light radiation, taking into account the fact that radiations of different wavelengths may lead to different levels of photobiological hazard in so far as, for example, a red radiation may contain less energy than a blue radiation; and distance (envisaged) between the source 10 and the audience A;

and so forth.

Once again just to provide another example, one or more aspects can facilitate modes of operation in which the light power emitted by a generator such as the one denoted by 12 in FIG. 2 can be either reduced or increased (possibly being varied dynamically), for example—as a function of a certain zoom configuration, a certain chromatic emission, a corresponding gobo image, and so forth—noting that at a certain moment during a show there may be a certain distance between the apparatus 10 and the audience A and in any case maintaining safe operating conditions.

To provide yet a further example, it is possible to envisage that the apparatus 10 may be kept operative in safety conditions in a basic mode (default safety setting), for example with operating modes in which certain functions—for example, regulation of the position of the focus, power of the light radiation, pan and tilt values—are deactivated or limited, thus containing the level of risk but at the same time maintaining the act of lighting.

This may occur, for example:

upon failure of an action of feedback by a given sensor;

in the case where the apparatus 10 loses contact (channel CC interrupted, either totally or in part) towards at least part of the control apparatuses, such as the ones exemplified in the right-hand part of FIG. 2; and in the presence of an alarm generated by an encoder or by any other sensor indicating occurrence of a failure detected in the apparatus 10.

Of course, upon occurrence of one of the above conditions, it is also possible for the module 102 to intervene so as to deactivate the generator 12 completely, for example in the case where the failure detected is to be considered as a serious failure such as not to allow continuation of operation.

A procedure of the type described above by way of example may be implemented in such a way as to operate in real time together with one or more sensor devices (e.g., included in one of the sets 112 or 114) capable of detecting and supplying to the unit 104 the distance between the output aperture of the apparatus 10 (e.g., the output aperture of the generator 12) and objects/people present along a possible path of projection of the lighting beam LB.

A device of this kind may, for instance, be a laser-scanning device of the LIDAR type, a (possibly stereoscopic) vision system, a radiofrequency scanning system, or else a set of proximity sensors that can supply alternative information or information of an augmented type (e.g., at the level of environmental maps).

Such a device can be configured so as to monitor (even in a substantially continuous way) the environment where the apparatus or apparatuses 10 is/are located and update in real time the map detected in the act represented by block 1006 in the flowchart of FIG. 3.

This information makes it possible, for example for a software resident in the unit 200, to re-calculate the (virtual) safety map in real time, to compare the measurements of radiance referred to a certain status of a generator 12 with the environment thus modified, and to decide whether to impose given operating parameters (value of output flux, movements of the beam LB of the generator 12, zoom/focusing configurations, and so forth) so as to facilitate maintenance of safe operating conditions (also) in positions that objects/people have come to occupy along the path of projection of the lighting beam LB.

As described herein, the act of mapping, which has referred to a number of times previously, can assume the character of a three-dimensional mapping of the surrounding environment.

The foregoing does not rule out the possibility, in simplified aspects, of this mapping act being of a two-dimensional or one-dimensional type, for example in the case where the movement of the beam LB of the apparatus 10 is such as to scan a two-dimensional space or else a one-dimensional space.

It is on the other hand possible to hypothesize recourse to a map in four dimensions, so as to be able to take into account the fact that the characteristics of the environment—for example, the position of obstacles or people—may change during operation. For instance, this may happen in the case where a mobile stage is used, or else a stage on which change of scenery is envisaged during the show, or else again in situations where the actors are expected to occupy different positions on the scene in the course of the show, and so forth.

In this regard, one or more aspects may envisage that the aforesaid obstacles and/or people may interact with the apparatus 10, for example via a WiFi or Bluetooth network, possibly installed in the apparatus 10.

As has been seen, in one or more aspects, it is possible to provide in the apparatus 10 (e.g., kept at the level of firmware/software of the apparatus 10 itself) environmental maps, which are in any case stored and available on the apparatus 10 irrespective of operation of the communication channel CC. In this way, it is possible to prevent conditions of failure of operation or undesired operation, for instance in the case where the communication channel CC is even momentarily interrupted or in the case where there intervene losses of information or errors of transmission of the information on the channel CC, for example starting from a database such as the database DB3 available at a cloud level.

Such safety characteristics (data) can be rendered intrinsic by envisaging that one or more of such memories are nonvolatile memories (EPROMs, flash memories, solid-state memories, and so forth).

In this way, operation of the apparatus 10 is facilitated, likewise preventing undesired loss of control data (e.g., following upon a failure or an involuntary reset) and rendering the corresponding information available for a new start-up of the apparatus 10.

Figure 4:
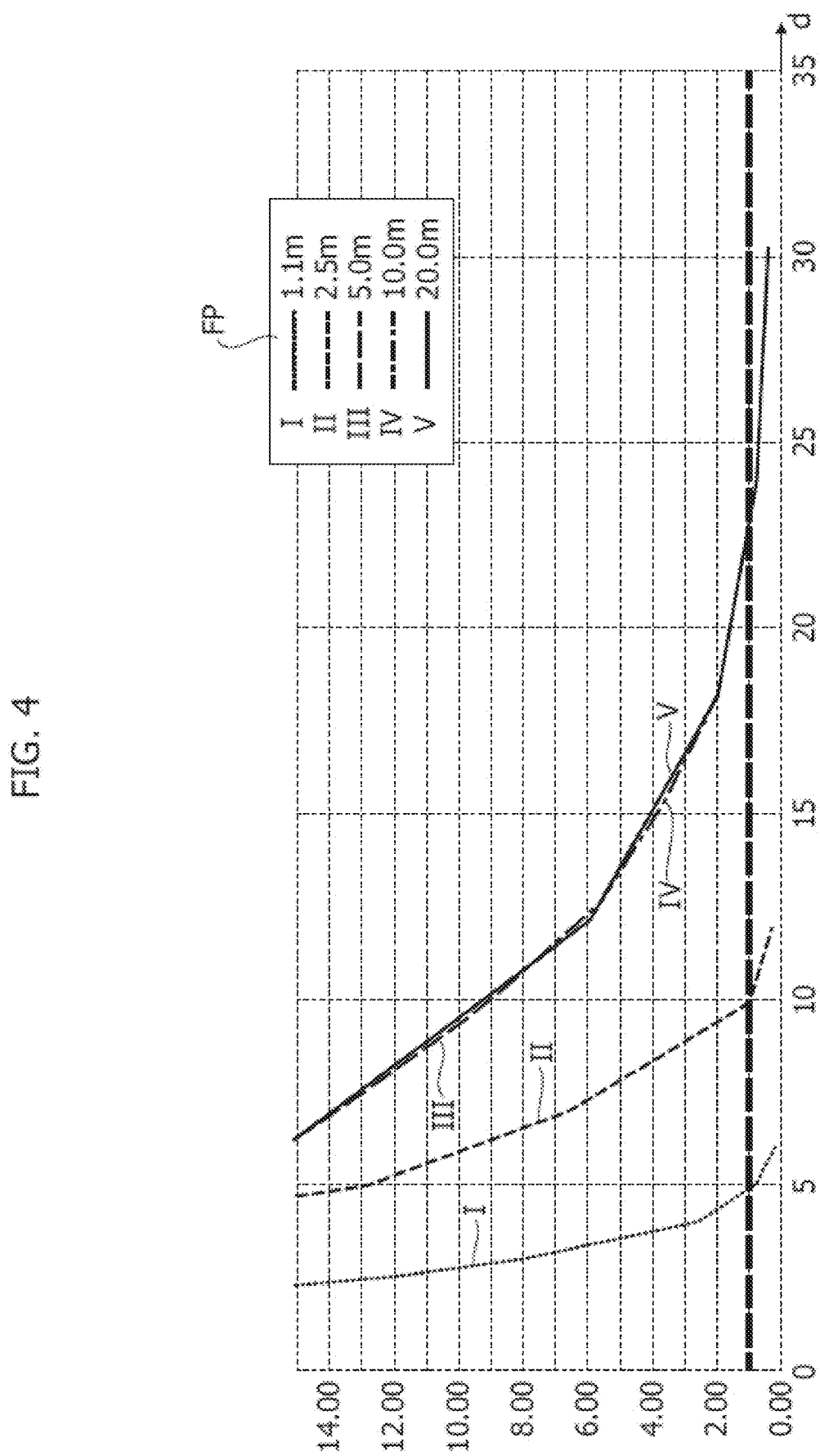
FIG. 4 shows a chart exemplifying possible conditions of operation of some aspects.

Examples of operating characteristics that can be achieved with one or more aspects are exemplified in the diagrams of FIG. 4.

These diagrams exemplify possible plots, as a function of the distance d (scale x of the abscissae, for example in meters) between a generator 12 and the eye of an observer who is directly struck by the beam LB emitted thereby with a corresponding value (scale y of the ordinates) of thermal retinal hazard ratio (thermal retinal radiance ratio, briefly, "retinal thermal ratio").

This ratio can be defined as the ratio between the (thermal) radiance that impinges upon the retina of an observer who is looking at a light-radiation generator and the limit of thermal radiance defined for a certain class of risk of the apparatus 10 (e.g., RG2, RG3, etc.). These latter limit values can be obtained—in some non-limiting examples—via measurements and/or via simulation. This ratio is discussed, for example, by the International Commission on Non-Ionizing Radiation Protection in the "ICNIRP Guidelines on Limits of Exposure to Incoherent Visible and Infrared Radiation" published in Health Physics 105(1):74-96 in 2013, by Seibersdorf Laboratories in a white paper titled "Analysis of the Blue Light Hazard Relative to the Retinal Thermal Hazard for Image Projectors," edition 2 of June 2016; and by Akoto Chama Leonel in "Determination of Retinal Thermal Hazard and Blue Light Photochemical Hazard Protection Needed by Automatic Welding Filters" in 2009.

In that respect, reference can be made to the IEC/EN 62471 regulation on Photobiological Safety of Lamps and Lamp Systems.

The retinal thermal hazard considered herein is an optical hazard associated to thermal effects induced by optical radiation warming up eye tissues.

While other kinds of optical hazard exist, like the one associated to blue light, IR or UV, retinal thermal hazard can be regarded as the most severe.

Hazard limits define the boundary between risks groups: RG0 (none), RG1 (low), RG2 (moderate), RG3 (high). Each hazard type can be measured according to the regulation considered (IEC/EN 62471 here), and then a risk group can be defined for each hazard type.

The RG classification of a source thus refers to the highest among the various hazard types as illustrated, for instance, in Table 6.1 (Emission limits for risk groups of continuous wave lamps) in IEC/EN 62471-1.

The retinal thermal limits can be defined in terms of radiance ($W*m^{-2}*sr^{-1}$), with the measured radiance "weighed" by the retinal response curve reported in the standard ("weighted radiance"). The source radiance changes with the distance, decreasing with increasing distance: the risk group of a certain fixture changes with distance. For instance, at a certain point, the risk group may pass from RG3 (high risk) to RG2 (moderate risk).

For instance, a retinal thermal ratio as discussed herein may be defined as the ratio between the weighted radiance and the retinal RG2 thermal limit (71000/alpha), namely the ratio between:

the measured radiance weighted by the retinal thermal curve in photobiological safety regulation IEC/EN 62471-5 (this being a more recent version than −1), the limit to move from RG2 (moderate risk) to RG3 (high risk), which is 71000/alpha, with alpha the source size measured according to IEC/EN 62471.

Reference to IEC/EN 62471 as made herein applies to the regulation as of the priority/filing date of the instant application.

The graph of the diagram of FIG. 4 exemplifies possible plots, each referring to a different condition of operation of a light-radiation generator (such as the generator 12 of FIG. 2) that can be identified as "focal position at X meters", a parameter that identifies the location of the focal point of the beam, namely the position—in the direction of propagation of the beam LB—where the radius (or diameter) of the beam has the minimum value.

For instance, the curves of FIG. 4 represent possible plots for values X equal, respectively, to 1.1 m-curve I,
2.5 m-curve II,
5.0 m-curve III,
10.0 m-curve IV,
20.0 m-curve V.

For the sake of completeness, it may be noted that initially (i.e., up against the generator of radiation) these curves first rise, reaching a maximum value and then drop progressively below the threshold value for different distances as a function of the focal position.

Instead, what would be expected is that these curves decrease as the distance from the generator increases. The behavior illustrated is linked to the criteria adopted by the formula introduced in the specifications for estimating the threshold radiance values, with a dependence upon the apparent size of the source as perceived by the observer, which in turn varies as a function of the focal position or else of the zoom configuration set on the generator.

What is of particular interest for the purposes of the aspects is in actual fact the "asymptotic" behavior (behavior beyond the maximum value) of the curves that represent the ratio between the radiance measured and the threshold radiance. Beyond a certain distance, in fact, the behavior of each of these curves is compatible with a monotonically decreasing function in which the ratio tends to zero at very long (e.g., ideally speaking, infinite) distances.

It will moreover be noted that curves like the curves denoted by III, IV and V practically coincide with one another, in particular starting from a certain value of the distance d onwards. This means that there exists a focal position beyond which there are no longer appreciable variations of behavior.

For what is of interest here, it may thus be noted that for each value of the parameter X defined previously, the thermal retinal hazard ratio decreases as the distance d along the axis x increases, i.e., as the observer moves away from the light-radiation generator until, at a certain (threshold) value of distance d along the axis x, the aforesaid ratio drops below unity—that is, below the value 1 (one)—the condition represented by a dashed horizontal line in FIG. 4.

This means that, for distances greater than the value at which the curve of the retinal ratio crosses the dashed line, operation can be considered "safe" in so far as the (photobiological) thermal hazard to which the observer is exposed is less than what is prescribed by the standards for a certain light-radiation generator to be classified within a certain level of class of risk (e.g., RG2, RG3 and so forth).

By way of example:

with the focal point of the beam (parameter X) at 1.1 m (curve I) the risk is less (i.e., to be more precise, it drops below the level associated to the corresponding class of risk) when the observer is located, for example, at a distance greater than 5 m from the generator 12;

with the focal point of the beam (parameter X) at 20 m (curve V) the risk is less when the observer is located, for example, at a distance greater than 23 m from the generator;

and so forth.

In one or more aspects, the apparatus 10 can be configured (e.g., at the level of data pre-loaded in a table such as the one designated by 106) with the corresponding information so as to be able to adopt (virtually in real time, for example via the circuitry 100) a condition of safe operation in conformance with the class of risk associated to the generator 12.

To provide some examples (which are of course not limiting):

with the focal position X of the generator 12 at 1.1 m (curve I) and with the observer at a distance of less than 5 m from the generator 12 (a position that can be detected in real time, for example via a proximity sensor or via a laser scanning system or an infrared viewer) it is possible to intervene so as to dim the generator 12, i.e., reduce the intensity of the radiation emitted thereby in order to bring the retinal radiance ratio below 1;

with the focal position X of the generator 12 at 2.5 m (curve II) and with the observer at a distance of more than 12 m from the apparatus 10 (as has been said, this position can be detected in real time, as discussed previously) it is possible to drive the generator 12 at full power, it being possible to count upon the fact that the retinal radiance ratio in this configuration is always less than 1 so that operation is safe within the corresponding class of risk;

with the focal position X of the generator 12 at 20 m (curve V) and the projector that scans with its beam (e.g., both during pan and during tilt) an illuminated space, it is once again possible to verify the position of an observer (e.g., a member of the audience) obtaining this information in the way described previously, with the possibility of defining lighting zones (e.g., the one denoted as LS1 in FIG. 1), where the generator 12 can be made to function at full power (knowing that the observer is in any case at a distance greater than 23 m from the generator 12) or else intervening on the generator 12 by dimming the intensity of the radiation emitted thereby until it is possibly deactivated altogether (perhaps gradually) and/or by intervening on the apparent size of the generator 12 (for instance, it is possible to change the focal position of the beam, for example with an act of zoom implemented via an optical system associated to the generator 12) in such a way as to bring the retinal radiance ratio back to a value of less than unity (that is, less than 1) in the position where the observer is expected to be: this can occur, for example, in an undesired lighting zone, such as the one designated by LS2 in FIG. 1.

Of course, the ones mentioned previously are only some of the possible interventions that may be implemented in (in a way in itself known) so as to aim at maintaining the retinal radiance ratio below the value of unity (that is the value 1-one).

A lighting apparatus as exemplified herein (e.g., 10) may include: a light-radiation generator (e.g., 12) configured to project a lighting beam (e.g., LB) in a direction (e.g., X12) towards a lighting space (e.g., LS1, LS2 in FIG. 1; the light-radiation generator having a certain class of risk associated therewith e.g., RG2, RG3, etc. with a limit of thermal radiance defined for that class of risk according to a specification such as IEC/EN 62471).

control circuitry (e.g., 100) of the light-radiation generator configured to control emission of the lighting beam of the light-radiation generator, and processing circuitry (e.g., 102, 104, 108) configured to calculate a thermal retinal radiance (hazard) ratio (as the ratio between the (thermal) radiance that impinges upon the retina of an observer who is looking at the light-radiation generator at a given distance—see, the scale of the abscissae x in FIG. 4—and the limit of thermal radiance defined for a certain class of risk e.g., RG2, RG3, etc.: see, for example, the curves I, II, III, IV, V of FIG. 4, showing how that ratio varies with the distance) of said light-radiation generator as a function of a distance from the light-radiation generator in said direction (that is as a function of the distance—measured in said direction—at which an observer may be looking at the light-radiation generator) and act on the control circuitry of the light-radiation generator for controlling the lighting beam (LB) of the light-radiation generator as a function of the thermal retinal radiance ratio calculated, (with the aim of) maintaining said thermal retinal radiance ratio below unity (that is, maintaining said ratio below the numerical value 1 or one) starting from a certain (threshold) value of distance (see again, for example, the scale of the abscissae x in FIG. 4) from the light-radiation generator in said direction.

In that way, for distances greater than the value at which the curve of the retinal ratio crosses (downwards) the dashed line, operation can be considered "safe" in so far as the (photobiological) thermal hazard to which the observer is exposed is less than what is prescribed by the standards for a certain light-radiation generator to be classified within a certain level of class of risk (e.g., RG2, RG3 and so forth).

It will be appreciated that the above direction does not necessarily have to coincide with the axis of emission of the radiation by the generator (X12, in the figures). One or more aspects may in fact envisage inhibition of certain orientations in space of the optical axis of the light-radiation generator, for example by preventing projection of the radiation in zones such as the zone LS2 of FIG. 1.

The expression "with the aim of maintaining" highlights the fact that the aforesaid ratio may also vary in time so that one or more aspects may envisage an act of dynamic control such as to maintain (or bring back) the ratio below unity (that is, below 1) dynamically in the presence of possible deviations, having precisely as target a value below unity (that is, below 1).

A lighting apparatus as exemplified herein may include said processing circuitry configured to obtain said certain (threshold) value of distance from the light-radiation generator in said direction from a space map (e.g., 106, 109) that indicates expected positions of objects (e.g., the members of the audience A) exposed to the lighting beam of the light-radiation generator.

A lighting apparatus as exemplified herein may include said processing circuitry configured to obtain said certain (threshold) value of distance from the light-radiation generator in said direction from at least one distance sensor (e.g., 114) sensitive to the distance from the light-radiation generator of objects (e.g., the members of the audience A) located along said direction.

In a lighting apparatus like the one exemplified herein, the aforesaid processing circuitry can be configured for acting on the control circuitry of the light-radiation generator in order to constrain emission of the lighting beam of the light-radiation generator via at least one of the following:

deactivation of the light-radiation generator;

dimming the lighting beam of the light-radiation generator;

variation of the spectrum of emission of the light-radiation generator;

variation of the apparent size of the source of the light-radiation generator;

variation of the angle and/or profile of intensity of the lighting beam of the light-radiation generator; and inhibition of certain orientations in space (see, for example, T1 and T2 in FIG. 1) of the optical axis (e.g., X12) of the light-radiation generator.

In a lighting apparatus as exemplified herein, the aforesaid control circuitry and processing circuitry can be at least partially integrated with the light-radiation generator, that is providing a (single) device which consists of the light-radiation generator and at least a part of the control circuitry and the processing circuitry.

A lighting apparatus as exemplified herein may include memory circuitry (e.g., 110, 106, 109) with stored therein at least one set of input data, which cause the control circuitry of the light-radiation generator to control emission of the lighting beam maintaining said thermal retinal radiance ratio below unity (that is, below 1) starting from a certain (threshold) value of distance from the light-radiation generator in said direction.

A lighting system as exemplified herein may include:

at least one lighting apparatus (e.g., 10) as exemplified herein; and lighting-control circuitry (e.g., C) configured (e.g., 200, 300, DB3) for supplying (e.g., CC) to said at least one lighting apparatus a space map (e.g., 200, DB3) that indicates expected positions of objects exposed to the lighting beam of the light-radiation generator in said at least one lighting apparatus.

The processing circuitry (for instance, 102, 104, 108) in said at least one lighting apparatus may thus be configured to obtain said threshold value of distance from the light-radiation generator along said direction from said space map indicative of expected positions of objects exposed to the lighting beam from the light-radiation generator, so that the thermal retinal radiance ratio can be maintained below unity (that is, below 1) at said objects (e.g. persons in an audience).

A method for operating a lighting apparatus as exemplified herein or a lighting system as exemplified herein may include:

obtaining (e.g., 110; 1000, 1002) sensor signals (e.g., 112, 114) that indicate operating parameters of said light-radiation generator and projection parameters of said lighting beam emitted by said light-radiation generator (12);

obtaining (e.g., 104, 200, 1004) a space map that indicates expected positions of objects exposed to the lighting beam of the light-radiation generator;

processing (e.g., 300, 1006, 1008) said sensor signals and said space map to produce a virtual zonal map including at least one first zone (e.g., LS1) and at least one second zone (e.g., LS2); and controlling (e.g., 1010) the lighting beam of the light-radiation generator differently in said at least one first zone and in said at least one second zone, wherein, in said at least one second zone the lighting beam of the light-radiation generator is constrained, with the aim of maintaining said thermal retinal radiance ratio below unity (that is, below 1) starting from a certain (threshold) value of distance from the light-radiation generator in said direction.

As exemplified herein, a computer program product, which can be loaded into a memory of at least one processing circuit (e.g., 102, 104, 300) may include portions of software code for implementing the method as exemplified herein. For instance, this may include a computer program product, loadable into a memory of processing circuitry in lighting apparatus as exemplified herein and including software-code portions which, when executed in said processing circuitry, cause said lighting apparatus to operate with the method exemplified herein.

Without prejudice to the underlying principles, the details of construction and the aspects may vary, even significantly, with respect to what has been illustrated herein purely by way of non-limiting example, without thereby departing from the sphere of protection.

For instance, there is mentioned—without this implying any limitation of scope—some possible benefits of one or more aspects:

definition of the allowed or desired lighting zone or zones LS1 (beam-allowed zone or zones) and of the undesired lighting zone or zones LS2 may be made, possibly dynamically, on the basis of measurements of the environment (e.g., of the stage S) of a visual nature, for example on the basis of images or on the basis of a scan (implemented, for example, via a LIDAR system) with possible transformation (e.g., via an image-recognition software) into a morphological map of the environment;

in addition or as an alternative to dimming or turning-off, the act of containment of the projection of the lighting beam LB of the light-radiation generator 12 towards the undesired lighting zone or zones LS2 may involve varying the spectral combination (color) of the light radiation of the beam LB, for example shifting from the blue region to the red region of the spectrum, taking into account the fact that radiations of different wavelengths can involve different levels of photobiological hazard in so far as, for example, a red radiation may contain less energy than a blue radiation;

turning-off of the generator 12 at the transition between an allowed or desired lighting zone LS1 and an undesired lighting zone LS2 can be obtained via a gradual dimming;

in the presence of two or more apparatuses 10, the checks (possibly pre-programmed) discussed previously can be conducted in relation to the combination of the radiations emitted by the above apparatuses: in one or more aspects, the aim of rendering use of a lighting apparatus safe (in the case exemplified, a laser projector), obtained by limiting the power of the lighting beam or else by moving the spectator away from the source (or vice versa) just to cite a couple of examples, can be pursued by taking into account the effect of two or more generators of radiation, which may be more hazardous than in the case of a single generator is present if a number of generators intercept simultaneously the eye of a spectator; one or more aspects may consequently take into account the case of a number of generators (multi-projector case), where the effects of a number of generators add up, with the corresponding safety measures, such as the reduction of the power of emission or a variation of the conditions of use of the projector (e.g., the distance, pan and tilt, zoom, etc.) that are recalculated/reviewed taking into account various possible configurations so that the measured values of retinal radiance will be reduced drop below the threshold value and will thus be brought within the range of safe use;

to reduce the intensity of the lighting beam of the light-radiation generator 12 it is possible to vary (e.g., by acting using an optical element, such as the aperture of a diaphragm) the diameter or profile of intensity of the beam 12;

to reduce the intensity of the lighting beam of the light-radiation generator 12, in addition or as an alternative to reduction of the value of the current and/or the other measures recalled above, it is possible to intervene by limiting the number of discrete radiation emitters (in the example considered here, laser diodes), selecting, from among the ones available, those that concur in creation of the lighting beam (in practice, turning off one or more of them, to the benefit of the electronics, which can work in a more contained range of currents), or else by inserting a neutral density filter, for example between the light engine and the gobo plane, so as to reduce the level of light power without intervening on the electronics;

calculation of a certain setting can be implemented in a short time (e.g., of the order of milliseconds);

to take into account possible response times of sensors associated with the apparatus 10 (see, for example, the sensors 112 or 114 in FIG. 2) the system can "anticipate" the conditions of regulation that define the value of HD, having it available at the moment of a possible transition through this value;

the location of the audience (A in FIG. 1) may also be evaluated (estimated) on the basis of data regarding the seats or places booked/sold, which can be used by the apparatus 10, for example, in so far as they can be inferred from respective ledgers, for instance of a blockchain type;

the apparatus and/or the processing functions associated thereto can be configured so as to be able to process, for instance using tools of artificial intelligence (AI), including neural-network devices, data regarding the use of the system itself, or of a similar system, as regards factors such as (mean) consumption, the number of times dimming has been carried out at a certain level, the pan and tilt angles used, the density and distribution of the audience, etc., there possibly being performing an act of training for the benefit of operation of the apparatus.

The scope of protection is determined by the annexed claims.

What is claimed is:

1. A lighting apparatus, comprising:
a light-radiation generator configured to project a lighting beam in a direction towards a lighting space;
control circuitry of the light-radiation generator configured to control emission of the lighting beam from the light-radiation generator; and
processing circuitry configured to calculate a thermal retinal radiance ratio of said light-radiation generator as a function of a distance from the light-radiation generator along said direction and act on the control circuitry of the light-radiation generator to control the lighting beam of the light-radiation generator as a function of the thermal retinal radiance ratio calculated maintaining said thermal retinal radiance ratio below 1 starting from a threshold value of distance from the light-radiation generator along said direction.

2. The lighting apparatus of claim 1, comprising said processing circuitry configured to obtain said threshold value of distance from the light-radiation generator along said direction from a space map indicative of expected positions of objects exposed to the lighting beam from the light-radiation generator.

3. The lighting apparatus of claim 1, comprising said processing circuitry configured to obtain said threshold value of distance from the light-radiation generator along said direction from at least one distance sensor sensitive to the distance from the light-radiation generator of objects located along said direction.

4. The lighting apparatus of claim 1, wherein said processing circuitry is configured to act on the control circuitry of the light-radiation generator to constrain emission of the lighting beam from the light-radiation generator by at least one of:
de-activating the light-radiation generator,
dimming the lighting beam from the light-radiation generator,
varying the emission spectrum of the light-radiation generator,
varying the size of the apparent source of the light-radiation generator,
varying the angle and/or the intensity profile of the lighting beam from the light-radiation generator, or
inhibiting certain orientations in space of the optical axis of the light-radiation generator.

5. The lighting apparatus of claim 1, wherein said control circuitry and said processing circuitry are at least partly integrated with the light-radiation generator.

6. The lighting apparatus of claim 1, comprising memory circuitry having stored therein at least one set of input data to cause the control circuitry of the light-radiation generator to control emission to control emission of the lighting beam by maintaining said thermal retina radiance ratio below 1 starting from said threshold value of distance to the light-radiation generator along said direction.

7. A lighting system, comprising:
at least one lighting apparatus according to claim 1; and
lighting-control circuitry configured to provide to said at least one lighting apparatus a space map indicative of expected positions of objects exposed to the lighting beam from the light-radiation generator in said at least one lighting apparatus, wherein said processing circuitry in said at least one lighting apparatus is configured to obtain said threshold value of distance from the light-radiation generator along said direction from said space map indicative of expected positions of objects exposed to the lighting beam from the light-radiation generator.

8. A method of operating lighting apparatus or a lighting system, comprising a light-radiation generator configured to project a lighting beam in a direction towards a lighting space, the method comprising:
obtaining sensor signals indicative of operating parameters of the light-radiation generator and projection parameters of the lighting beam from the light-radiation generator;
obtaining a space map indicative of expected positions of objects exposed to the lighting beam from the light-radiation generator;
processing the sensor signals and the space map and producing a virtual zonal map including at least one first zone and at least one second zone; and
controlling the lighting beam from the light-radiation generator differently in the at least one first zone and in the at least one second zone wherein, in the at least one second zone, the lighting beam from the light-radiation generator is constrained maintaining a thermal retina radiance ratio below 1 starting from a threshold value of distance from the light-radiation generator along the direction.

9. One or more non-transitory computer readable media storing instructions executable by a processor to:
obtain sensor signals indicative of operating parameters of a light-radiation generator and projection parameters of a lighting beam from the light-radiation generator;
obtain a space map indicative of expected positions of objects exposed to the lighting beam from the light-radiation generator;
process the sensor signals and the space map and producing a virtual zonal map including at least one first zone and at least one second zone; and
control the lighting beam from the light-radiation generator differently in the at least one first zone and in the at least one second zone wherein, in the at least one second zone, the lighting beam from the light-radiation generator is constrained maintaining a thermal retina radiance ratio below 1 starting from a threshold value of distance from the light-radiation generator along the direction.

\* \* \* \* \*